United States Patent Office 2,820,824
Patented Jan. 21, 1958

2,820,824

PURIFICATION OF NEUTRAL TETRACYCLINE

Joseph F. Weidenheimer, Pearl River, and Lawrence Ritter, Suffern, N. Y., assignors to American Cyanamid Company, New York, N. Y., a corporation of Maine No Drawing. Application April 15, 1957
Serial No. 652,646

6 Claims. (Cl. 260—559)

This invention relates to the purification of tetracycline and more particularly is concerned with an improved process of purifying neutral tetracycline so as to produce a product having improved visual appearance, of low color value and being essentially tasteless.

There is a great demand for tasteless tetracycline for use in various pharmaceutical preparation such as syrups, oral suspensions, liquid pediatric drops, etc. The usual tetracycline production material produced by the catalytic reductive dechlorination of chlortetracycline, has various bitter-tasting impurities and colored materials associated therewith. While the tetracycline is eminently suitable for many purposes such as in tablets, capsules, ointments, etc. it cannot readily be used orally as the bitter taste associated therewith renders the product undesirable for use in syrups, oral suspensions, liquid pediatric drops, etc.

The present invention is based upon the discovery that an essentially tasteless crystalline neutral tetracycline product of low color value and of excellent visual appearance can be produced by subjecting tetracycline prepared by the catalytic reductive dechlorination of chlortetracycline to a series of steps whereby the tetracycline is freed from its association from the accompanying objectionable impurities. The tetracycline free base so produced is in the form of pale, lemon-yellow or straw-colored highly refractive crystals which are relatively tasteless, and as such the improved product finds wide use in oral pharmaceutical preparations such as tetracycline syrups, oral suspensions, liquid pediatric drops, etc.

It has been observed that by precipitating neutral tetracycline from solutions containing the same at a pH not above about 3 and in the presence of a reducing agent, or inhibitor of oxidation, as more particularly hereinafter described, it is possible to crystallize out essentially tasteless tetracycline neutral under such conditions as to leave the contaminating and bitter-tasting impurities in solution. The tetracycline neutral can then be easily removed from the solution, as by filtration, to produce an improved comparatively tasteless product.

The present invention is preferably carried out by first adjusting the pH of an aqueous solution or slurry of impure tetracycline prepared by the catalytic reductive dechlorination of chlortetracycline to a pH of between about 0.5–2 and preferably about 1. This adjustment may be effected by any of the common acids such as hydrochloric acid, sulfuric acid, etc. The acid treatment solubilizes the tetracycline and brings it into solution. A filter aid, or an adsorbent, such as Magnesol, which is a hydrated magnesium silicate of the approximate composition $MgO \cdot 2.5SiO_2 \cdot H_2O$, is added and the solution is filtered using Hyflo (diatomaceous earth). It is preferred to add the Magnesol to the solution of tetracycline and stir the solution for a short time before filtering the solution as apparently the Magnesol also acts as an adsorbent to adsorb some of the contaminating impurities. After the solution is filtered, an alkali metal or ammonium sulfite, or a mixture thereof, is added to the filtrate and the pH is adjusted to not more than about pH 3 by the use of mild caustic, such as sodium hydroxide solution, whereupon purified essentially tasteless tetracycline neutral precipitates. The purified product is thereafter filtered off leaving the accompanying colored materials and objectionable bitter-tasting materials behind. The neutral tetracycline so-produced is a light-colored, stable product and is essentially tasteless.

The alkali metal or ammonium sulfite may be present in amounts varying from about 0.9% to about 15% by weight based on the tetracycline present. It has been found, however, that for commercial purposes, a range of from about 5% to about 10% is preferred.

The impure tetracycline starting material for use in the present invention is prepared by the reductive dechlorination of chlortetracycline. Two suitable methods for effecting such reductive dechlorination, each of which involves catalytic reduction in the presence of noble metal catalysts, are described in J. A. C. S. 75, 4621 (1953) and in the McCormick et al. U. S. Patent No. 2,731,497.

The procedure described in J. A. C. S. 75, 4621 (1953), involves reductively dechlorinating chlortetracycline in the presence of palladium on charcoal catalyst and one mole of triethylamine until slightly over one mole of hydrogen is absorbed. During the reduction, the chlortetracycline is suspended in methyl cellosolve. After the uptake of hydrogen practically stops, which is after one mole is absorbed, the catalyst is filtered off and the filtrate is mixed with an equal volume of water and the free base of tetracycline crystallizes. The tetracycline free base is then dissolved in n-butanol by adding hydrochloric acid so as to crystallize the tetracycline from solution as the hydrochloride. The procedure of the McCormick et al. patent is similar to the procedure of the J. A. C. S. reference except that palladium hydroxide is used as the catalyst. In each of these procedures other solvents for the chlortetracycline than methyl cellosolve may obviously be used. Thus, the lower aliphatic alkanols such as methanol, ethanol, n-butanol may be used as well as other lower alkoxy lower alkanols such as 2-ethoxyethanol or mixtures of lower alkanols and lower alkoxy lower alkanols may be used. Other noble metal catalysts than palladium, such as platinum, for example, may similarly be used in the hydrogenolysis reaction.

The invention will be described in greater detail in conjunction with the following specific examples.

*Example 1*

According to the procedure of J. A. C. S. 75, 4621 (1953), one kilogram of chlortetracycline hydrochloride is suspended in four liters of methyl cellosolve containing 2% water. Triethylamine is added (excess of 2 equivalents) to bring the pH to about 8 when the chlortetracycline goes into solution. To this solution is added 50 grams of palladium on charcoal, and reduced with hydrogen in a well stirred kettle, keeping the solution below 45° C. After the reduction is complete, the catalyst is filtered off. The filtrate is mixed with 2 volumes of n-butanol and acidified to pH 2 with hydrochloric acid to precipitate tetracycline hydrochloride. Fifty grams of the tetracycline hydrochloride so-produced, are slurried in 500 milliliters of water. The slurry is adjusted to pH 1 with concentrated hydrochloric acid. 2.5 grams of hydrated magnesium silicate (Magnesol) are added with stirring. 5.0 grams of diatomaceous earth are added and the solution is filtered. The filter cake is rinsed with water and added to the filtrate. 2.6 grams of sodium sulfite in 10 milliliters of water are added to the filtrate. The filtrate is adjusted to a pH of 2.8 with 75 milliliters of 3.5% sodium hydroxide. The solution is stirred, aged for 3 hours, filtered and dried. The product is reslurried in 35 milliliters of water, filtered and dried under vacuum at 50° C. for 23 hours. An 89% yield of an essentially tasteless tetracycline neutral product is produced.

*Example 2*

Eighty kilos of tetracycline hydrochloride prepared according to the procedure described in Example 1 are slurried in 710 liters of water. The slurry is adjusted to a pH of 1.0–1.3 with concentrated hydrochloric acid. Four kilos of hydrated magnesium silicate (Magnesol) are added and the mixture is stirred for 30 minutes. Four kilos of diatomaceous earth are added with agitation and the mixture is thereafter filtered. The filter cake is washed with 90 liters of water which is added to the filtrate. The filtrate is treated with a solution of 40 liters of water containing 3.8 kilos of reagent grade anhydrous sodium sulfite. This solution is added rapidly with good agitation. After the addition of the sulfite the pH is between 1.5–1.6. The solution is adjusted to a pH of 2.8–3 with a solution of 3.5% sodium hydroxide and the mixture is stirred. The crystallized tetracycline free base is filtered off after aging for one hour, is then washed and dried. A comparatively tasteless tetracycline neutral product in 78% yield is obtained.

Comparable results are obtained when ammonium sulfite and potassium sulfite, and mixtures thereof are used, respectively, for the sodium sulfite used in Example 1.

This application is a continuation-in-part of our application Serial No. 575,982, filed April 4, 1956, now abandoned.

We claim:

1. The process of producing essentially tasteless tetracycline neutral which comprises adjusting the pH of an aqueous slurry of impure tetracycline prepared by catalytically reductively dechlorinating chlortetracycline with hydrogen in the presence of a noble metal catalyst to a pH of between 0.5–2 so as to dissolve the tetracycline, adding a filter aid thereto, filtering, adding to the filtrate from about 0.9 percent to about 15 percent based on the weight of the tetracycline of a compound selected from the group consisting of alkali metal sulfites, ammonium sulfite and mixtures thereof; and adjusting the pH of the resulting aqueous solution to not more than about 3 whereupon purified essentially tasteless tetracycline neutral crystallizes therefrom and the impurities remain in solution.

2. The process according to claim 1 in which the sulfite is sodium sulfite.

3. The process according to claim 1 in which the initial pH adjustment is at a pH of about 1.

4. The process of producing essentially tasteless tetracycline neutral which comprises adjusting the pH of an aqueous slurry of impure tetracycline prepared by catalytically reductively dechlorinating chlortetracycline with hydrogen in the presence of a noble metal catalyst to a pH of between 0.5–2 so as to dissolve the tetracycline, adding a filter aid thereto selected from the group consisting of magnesium silicate and diatomaceous earth, filtering, adding to the filtrate from about 0.9 percent to about 15 percent based on the weight of the tetracycline of a compound selected from the group consisting of alkali metal sulfites, ammonium sulfite and mixtures thereof; and adjusting the pH of the resulting aqueous solution to not more than about 3 whereupon purified essentially tasteless tetracycline neutral crystallizes therefrom and the impurities remain in solution.

5. The process according to claim 4 in which the sulfite is sodium sulfite.

6. The process according to claim 4 in which the initial pH adjustment is at a pH of about 1.

No references cited.